United States Patent
Manoharan et al.

(10) Patent No.: US 11,900,271 B2
(45) Date of Patent: *Feb. 13, 2024

(54) SELF LEARNING DATA LOADING OPTIMIZATION FOR A RULE ENGINE

(71) Applicant: PayPal, Inc., San Jose, CA (US)

(72) Inventors: Srinivasan Manoharan, San Jose, CA (US); Vinesh Chirakkil, San Jose, CA (US); Jun Zhu, San Jose, CA (US); Christopher S. Purdum, Sunnyvale, CA (US); Sahil Dahiya, San Jose, CA (US); Gurinder Grewal, San Jose, CA (US); Harish Nalagandla, San Jose, CA (US); Girish Sharma, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/549,738

(22) Filed: Dec. 13, 2021

(65) Prior Publication Data

US 2022/0207385 A1 Jun. 30, 2022

Related U.S. Application Data

(63) Continuation of application No. 15/942,336, filed on Mar. 30, 2018, now Pat. No. 11,200,500, which is a
(Continued)

(51) Int. Cl.
*G06Q 40/00* (2023.01)
*G06N 5/025* (2023.01)
*G06Q 20/40* (2012.01)

(52) U.S. Cl.
CPC ......... *G06N 5/025* (2013.01); *G06Q 20/4016* (2013.01)

(58) Field of Classification Search
CPC .................. G06N 5/025; G06N 20/4016
See application file for complete search history.

(56) References Cited

U.S. PATENT DOCUMENTS 6,976,147 B1 * 12/2005 Isaac ............... G06F 12/0862
711/205
9,697,524 B1   7/2017 Fischer et al.
(Continued)

FOREIGN PATENT DOCUMENTS

EP   3101603 A1 * 12/2016 ............ G06Q 10/06
EP   3101603 A1   12/2016
(Continued)

OTHER PUBLICATIONS

Yang et al., "Overlapping Dependent Loads with Addressless Perload," University of Florida, Computer and Information Science and Engineering, 2006 (Year: 2006).*
(Continued)

*Primary Examiner* — Hani M Kazimi
*Assistant Examiner* — William B. Bunker
(74) *Attorney, Agent, or Firm* — Haynes and Boone, LLP

(57) ABSTRACT

Methods and systems for using machine learning to automatically determine a data loading configuration for a computer-based rule engine are presented. The computer-based rule engine is configured to use rules to evaluate incoming transaction requests. Data of various data types may be required by the rule engine when evaluating the incoming transaction requests. The data loading configuration specifies pre-loading data associated with at least a first data type and lazy-loading data associated with at least a second data type. Statistical data such as use rates and loading times associated with the various data types may be supplied to a machine learning module to determine a particular loading configuration for the various data types. The computer-based rule engine then loads data according to the data loading
(Continued)

| | Trans. Type | Mobile | Am. >500 | Data Types |
|---|---|---|---|---|
| Path 1 | Login | Yes | N/A | Type Set 1 |
| Path 2 | Login | No | N/A | Type Set 2 |
| Path 3 | Pay | Yes | Yes | Type Set 3 |
| Path 4 | Pay | Yes | No | Type Set 4 |
| Path 5 | Pay | No | Yes | Type Set 5 |
| Path 6 | Pay | No | No | Type Set 6 |
| Path 7 | Add Card | Yes | N/A | Type Set 7 |
| Path 8 | Add Card | No | N/A | Type Set 8 | configuration when evaluating a subsequent transaction request.

20 Claims, 9 Drawing Sheets

Related U.S. Application Data continuation-in-part of application No. 15/844,464, filed on Dec. 15, 2017, now Pat. No. 11,227,220.

(56) References Cited

U.S. PATENT DOCUMENTS

| | | | |
|---|---|---|---|
| 9,990,636 B1 * | 6/2018 | Lewis | G06Q 30/016 |
| 10,679,160 B1 * | 6/2020 | Mcfeeters | G06F 21/6218 |
| 2003/0208684 A1 | 11/2003 | Camacho et al. | |
| 2004/0068501 A1 | 4/2004 | McGoveran | |
| 2004/0215891 A1 * | 10/2004 | Dodson | G06F 12/0215 |
| | | | 711/E12.004 |
| 2006/0230236 A1 * | 10/2006 | Finkelstein | G06F 12/0862 |
| | | | 711/137 |
| 2006/0235714 A1 * | 10/2006 | Adinolfi | G06Q 40/06 |
| | | | 705/1.1 |
| 2006/0282660 A1 | 12/2006 | Varghese et al. | |
| 2007/0079136 A1 | 4/2007 | Vishik et al. | |
| 2007/0239797 A1 | 10/2007 | Cattell et al. | |
| 2012/0317008 A1 | 12/2012 | Subramanian et al. | |
| 2012/0317013 A1 | 12/2012 | Luk et al. | |
| 2013/0218765 A1 | 8/2013 | Hammad et al. | |
| 2013/0262279 A1 | 10/2013 | Finley et al. | |
| 2015/0046340 A1 | 2/2015 | Dimmick | |
| 2015/0170148 A1 | 6/2015 | Priebatsch | |
| 2016/0063502 A1 | 3/2016 | Adjaoute | |
| 2016/0140537 A1 | 5/2016 | Salcedo et al. | |
| 2016/0342963 A1 * | 11/2016 | Zoldi | G06N 7/01 |
| 2016/0358130 A1 * | 12/2016 | Capurro | G06Q 30/0613 |
| 2016/0371699 A1 | 12/2016 | Proctor | |
| 2017/0017962 A1 * | 1/2017 | Knoblauch | G06Q 20/4016 |
| 2017/0148021 A1 | 5/2017 | Goldstein et al. | |
| 2018/0026984 A1 | 1/2018 | Maker et al. | |
| 2018/0218041 A1 * | 8/2018 | Arthanarisamy | |
| | | | G06F 16/24542 |
| 2019/0019169 A1 | 1/2019 | McLaughlin et al. | |
| 2019/0102411 A1 | 4/2019 | Hung et al. | |
| 2019/0164176 A1 | 5/2019 | Pydynowski et al. | |
| 2020/0250643 A1 | 8/2020 | Kursun et al. | |
| 2020/0258087 A9 | 8/2020 | Knoblauch | |

FOREIGN PATENT DOCUMENTS

| | | | | |
|---|---|---|---|---|
| WO | 2009039419 A1 | 3/2009 | | |
| WO | 2013082190 A1 | 6/2013 | | |
| WO | WO-2013082190 A1 * | 6/2013 | | G06F 21/577 |
| WO | 2018059656 A1 | 4/2018 | | |

OTHER PUBLICATIONS

Sura et al., Data Access Optimization in a Processing in Memory System, IBM Watson Research Center, 2015 (Year: 2016).*
Ebbers M., et al., "Fidelity National Information Systems Payments Reference Architecture for IBM System z," International Technical Support Organization, http://www.redbooks.ibm.com/, SG24-7507-00, Sep. 2008, 228 pages.
International Search Report and Written Opinion for International Application No. PCT/US2018/065872 dated Mar. 8, 2019, 6 pages.
Kooijmans A.L., et al., "Transaction Processing: Past, Present, and Future," http://www.redbooks.ibm.com/, SG24-7507-00, 2012, 66 pages.

* cited by examiner

| | Trans. Type | Mobile | Am. >500 | Data Types |
|---|---|---|---|---|
| Path 1 | Login | Yes | N/A | Type Set 1 |
| Path 2 | Login | No | N/A | Type Set 2 |
| Path 3 | Pay | Yes | Yes | Type Set 3 |
| Path 4 | Pay | Yes | No | Type Set 4 |
| Path 5 | Pay | No | Yes | Type Set 5 |
| Path 6 | Pay | No | No | Type Set 6 |
| Path 7 | Add Card | Yes | N/A | Type Set 7 |
| Path 8 | Add Card | No | N/A | Type Set 8 |

Figure 5

SELF LEARNING DATA LOADING OPTIMIZATION FOR A RULE ENGINE

CROSS-REFERENCE TO RELATED APPLICATIONS

The present application is a continuation application of U.S. patent application Ser. No. 15/942,336, filed Mar. 30, 2018, which is a Continuation in part of patent application Ser. No. 15/844,464, filed Dec. 15, 2017, and is incorporated in reference in its entirety.

BACKGROUND

The present specification generally relates to processing electronic transaction requests, and more specifically to, improving the performance of a rule engine in processing electronic transaction requests.

RELATED ART

Today, an entity such as a bank or a retail store that provides online services to users may receive millions of online transaction requests each day. In addition to providing adequate services to the users, the entities also need to prevent unauthorized access to user accounts. For example, malicious users are known to use various tactics such as phishing or man-in-the-middle attacks to obtain credentials associated with user accounts, and perform unauthorized transactions using those user accounts. In these instances, the entities need to differentiate unauthorized requests from authorized ones such that the user accounts are protected from unauthorized access and use. For example, the entities may deny requests that are determined to be possibly unauthorized. Furthermore, by denying the unauthorized requests, more processing power may be spent on processing the authorized requests, thus improving the service performance and quality for the legitimate users, while reducing the amount of computational power needed for processing and then remedying unauthorized requests.

Conventionally, rule engines may be used to determine, in real-time, whether a received transaction request is possibly an unauthorized or fraudulent transaction request. However, as a rule engine becomes more complicated having to take into account a large number of different scenarios, they become inefficient. For example, some rule engines may require a large amount of data related to the transaction request and to an account associated with the transaction request in order to make such a determination. While some of the data may be obtained directly from the transaction request, other data may require retrieval from a data source, which causes delay in the authorization determination process and affects service performances to end users. Even when the data source is an internal data source within the network infrastructure of an organization, due to the enormous amount of data required to be retrieved, the performance may suffer. Thus, there is a need for improving the performances of rule engines.

BRIEF DESCRIPTION OF THE FIGURES

FIG. 5 illustrates an exemplary data structure for storing information associated with potential paths for evaluating a transaction request according to an embodiment of the present disclosure;

Figure 1:
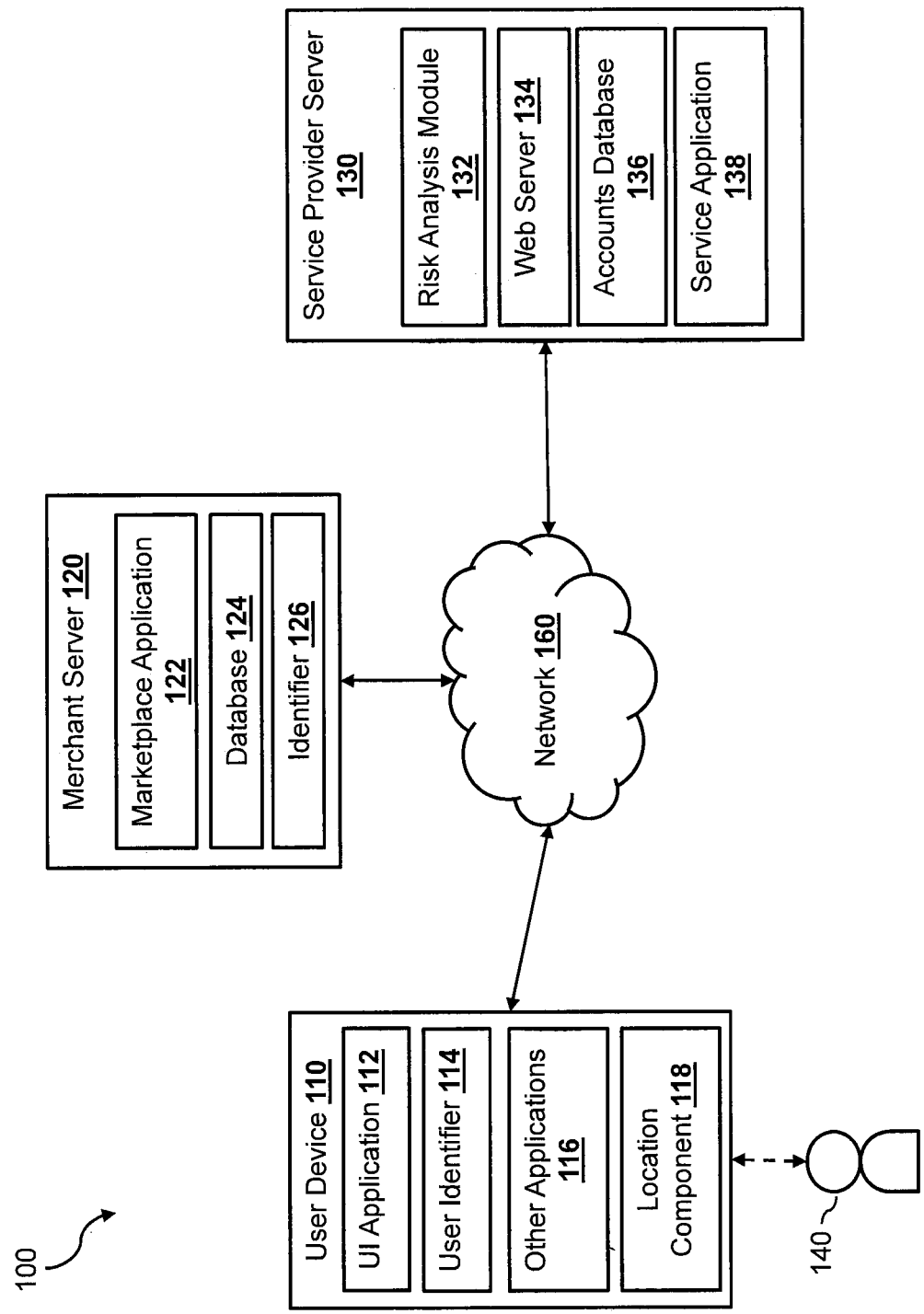
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a mechanism that automatically discovers types of data required by a computer-based rule engine for evaluating a transaction request based on information extracted from the transaction request. The rule engine is communicatively coupled with a computer server, such as a web server, that receives transaction requests from users. Each request is for a particular service provided by an entity in association with a user account with the entity. Example transaction requests may include a log-in request for logging into a user account with the entity, a payment request for making a payment from a user account with the entity, and a request to add an additional funding source to a user account with the entity.

A rule engine comprises numerous conditions, and is configured to provide an outcome for the transaction request by analyzing the transaction request according to the conditions. In some embodiments, the outcome provided by the rule engine may be a binary outcome—an indication of whether the transaction request is a legitimate request or a fraudulent request. In other embodiments, the outcome provided by the rule engine may be a score that indicates a likelihood that the transaction request is a fraudulent request. The outcome may then be provided to the computer server such that the computer server may process (e.g., approve or deny) the online transaction request accordingly. Thus, it is often required that the rule engine evaluates the online transaction requests in real-time (e.g., within a second from receiving such an online transaction request) such that the computer server may timely process the online transaction requests.

In some embodiments, in order to evaluate the numerous conditions for generating the outcome, the rule engine requires a variety of information related to the online transaction request and/or information related to a user account associated with the online transaction request. The information may include one or more of an Internet Protocol (IP) address of a source of the transaction request, a number of successful transactions within a predetermined period of time, a number of failed transactions within the predetermined period of time, a time, a browser type, a device type, an amount associated with the transaction, or a transaction type of the transaction. Some of the information required by the rule engine to generate the outcome may be extracted directly from the transaction request (e.g., IP address of the source of the transaction request, a payment amount, etc.) while some other information required by the rule engine may be retrieved from a device used to initiate the request, from an internal source (other servers or databases related to the rule engine that store relevant information related to a user account), or even from an external source (e.g., a credit bureau, etc.). As such, some of the information may be obtained quicker than other information.

Furthermore, the type of information required by the rule engine in order for the rule engine to generate the outcome may vary from transaction request to transaction request, as some of the information required by the rule engine may depend on one or more factors, such as other information related to the transaction request or whether one or more conditions are satisfied. For example, the rule engine may include multiple paths for evaluating a transaction request, where each path may include one or more conditions. The rule engine may take different paths to evaluate different transaction requests, for example, due to the different transaction requests being associated with different transaction types. The rule engine may evaluate a login request using a first path and may evaluate a payment transaction request using a second path, where the information required to evaluate the request under the first path is different from the information required to evaluate the request under the second path.

Conventionally, a rule engine may, at the outset of evaluating a transaction request, retrieve all information required to evaluate every one of the conditions in the rule engine (e.g., the conditions from both the first and the second paths, assuming the rule engine only has two paths). The benefit of such an approach is that the information is readily available to the rule engine when it is needed to evaluate each condition along the evaluation process, and the time for the actual evaluation would be relatively short. However, since not all of the retrieved information may be necessary for the rule engine to generate the outcome, the time to retrieve the unneeded information may be wasted.

Under another approach, a rule engine may not retrieve information at the outset, but instead, retrieve information only when the information is absolutely needed during the process of evaluating the transaction request (e.g., when the rule engine needs the information to determine whether a condition is satisfied). This way, only information that is necessary for the rule engine to generate an outcome for the transaction request (only the information required to evaluate the transaction request under a particular path) is retrieved, which eliminates the time to retrieve unnecessary information. However, this approach delays the process of evaluating the transaction request, which is also undesirable.

It has been contemplated that the performance of the rule engine may be further improved under a third approach where the types of data that are not required by the rule engine to evaluate a transaction request may be identified at the outset based on information extracted directly from the transaction request. The types of data not identified (which may be potentially required by the rule engine) may then be retrieved prior to performing the evaluation of the transaction request. This way, all information that may be needed during the evaluation is readily available when the rule engine needs it, but the time to retrieve unnecessary information may be reduced.

In some embodiments, all potential paths that the rule engine may traverse in evaluating a transaction request are determined. Each path may include one or more conditions. Information from the transaction request may be extracted. Based on the information extracted from the transaction request, a subset of the potential paths may be determined to be irrelevant or unnecessary in evaluating the transaction request, and therefore eliminated from consideration. The types of data that are required under the remaining potential paths may be retrieved to evaluate the transaction request. The transaction request may then be evaluated using the rule engine through one of the remaining potential paths based on the retrieved data. In some embodiments, the rule engine may provide an outcome that indicates whether the transaction request is possibly an unauthorized/fraudulent request. The transaction request may then be processed (or denied) according to the generated outcome.

Different embodiments may use different techniques to determine the potential paths that are irrelevant to evaluating the transaction request. In some embodiments, an abstract syntax tree may be generated based on parsing the rules in the rule engine. The abstract syntax tree is a tree-based data structure that includes inter-connected nodes. Each node represents a set of conditions for evaluating the transaction request, and nodes that are serially connected together by edges form a path. By traversing the abstract syntax tree, such as using a depth first search method or a breadth first search method, the numerous potential paths for evaluating a transaction request according to the rule engine may be determined. Furthermore, conditions for determining which one or more potential paths that a transaction request may follow according to the rule engine may also be retrieved. By analyzing the data extracted from the transaction request based on the conditions, one or more potential paths may be determined to be irrelevant, e.g., not needed, to evaluating the transaction request. For example, when the data extracted from the transaction request indicates that the transaction request is a login request and a first potential path in the abstract syntax tree is only for evaluating a payment transaction request, it can be determined that the first potential path is irrelevant to evaluating the transaction request.

After determining that one or more potential paths are not relevant to evaluating the transaction request, the types of data that are required for evaluating the transaction request in the remaining paths according to the rule engine may be determined. Data related to the determined types of data may then be retrieved for evaluating the transaction request.

In some embodiments, the abstract syntax tree and information of the different potential paths derived from the abstract syntax tree may be stored as metadata for the rule engine, to be used in any subsequent evaluations of transaction requests.

FIG. 1 illustrates an electronic transaction system 100 according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account to conduct account services or conduct financial transactions (e.g., account transfers or payments) with the service provider server 130. Similarly, a merchant associated with the merchant server 120 may use the merchant server 120 to log in to a merchant account to conduct account services or conduct financial transactions (e.g., payment transactions) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct transactions (e.g., shopping, purchasing, bidding, etc.) with the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., eBay® of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

In various embodiments, the service provider server includes a risk analysis module 132 that is configured to determine whether to authorize or deny an incoming request from the user device 110 or from the merchant server 120. The request may be a log-in request, a fund transfer request, a request for adding an additional funding source, or other types of requests associated with the variety of services offered by the service provider server 130. As such, when a new request is received at the service provider server 130 (e.g., by the web server 134), the risk analysis module 132 may analyze (or evaluate) the request and determine whether the request is possibly an unauthorized/fraudulent request based on information available to the risk analysis module. The risk analysis module 132 may transmit an indication of whether the request is possibly an unauthorized/fraudulent request to the web server 134 and/or the service application 138 such that the web server 134 and/or the service application 138 may process (e.g., approve or deny) the request based on the indication.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the risk analysis module 132 to determine whether to authorize or deny a request associated with the user account. In certain embodiments, account information also includes user purchase profile information such as account funding options and payment options associated with the user, payment information, receipts, and other information collected in response to completed funding and/or payment transactions.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

Figure 2:
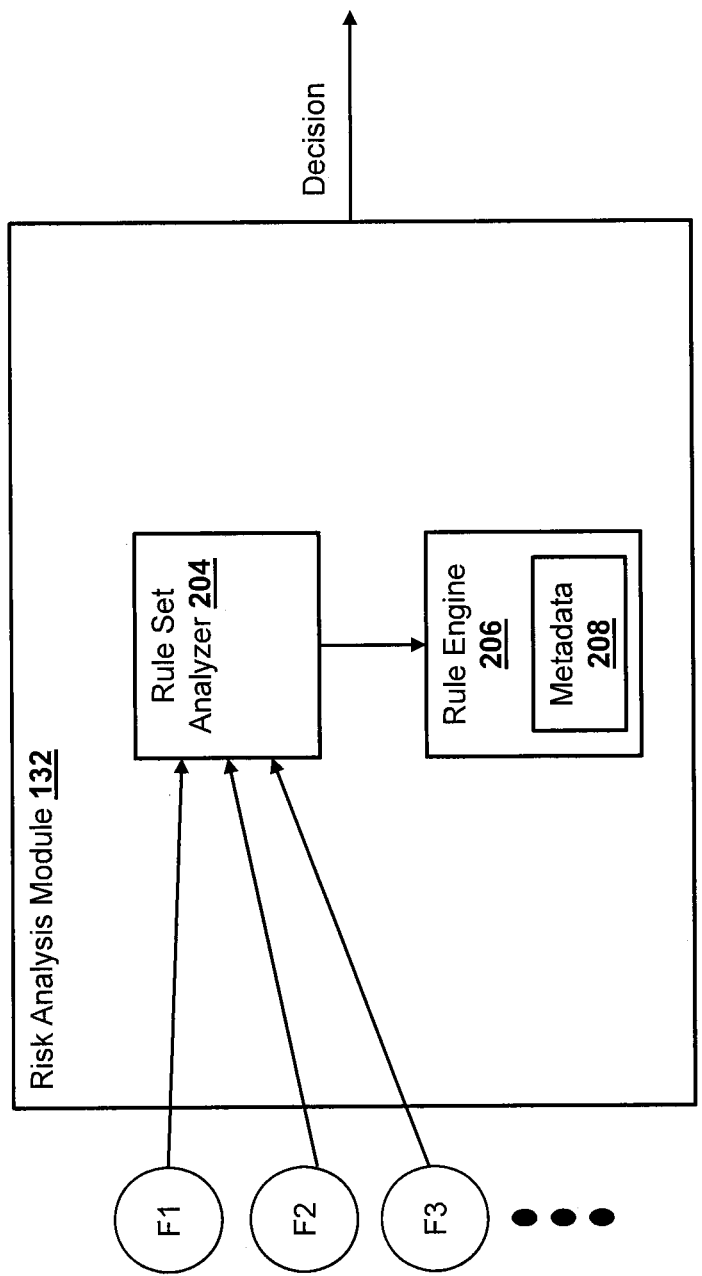
FIG. 2 is a block diagram illustrating a risk analysis module according to an embodiment of the present disclosure.

FIG. 2 illustrates a block diagram of the risk analysis module 132 according to an embodiment of the disclosure. The risk analysis module 132 includes a rule set analyzer 204 and a rule engine 206. The rule engine 206 is a computer-based rule engine and may include multiple different sets of rules (or conditions) for evaluating a transaction request. When a transaction request is received by the risk analysis module 132 (e.g., a user initiated request received via the web server 134), the rule engine 206 may use at least some of the different sets of conditions to evaluate the transaction request in order to generate an outcome. As discussed above, in some embodiments, based on whether some of the conditions are satisfied or not (using the data related to the transaction engine), the rule engine 206 may generate an outcome that indicates whether the request is possibly an unauthorized/fraudulent request. The outcome may be a binary outcome or a score that indicates a likelihood of whether the request is possibly an unauthorized/fraudulent request. The outcome may be transmitted to other modules of the service provider server 130, such as the web server 134 and/or the service application 138, such that these other modules may process (e.g., approve or deny) the transaction request accordingly.

Figure 3:
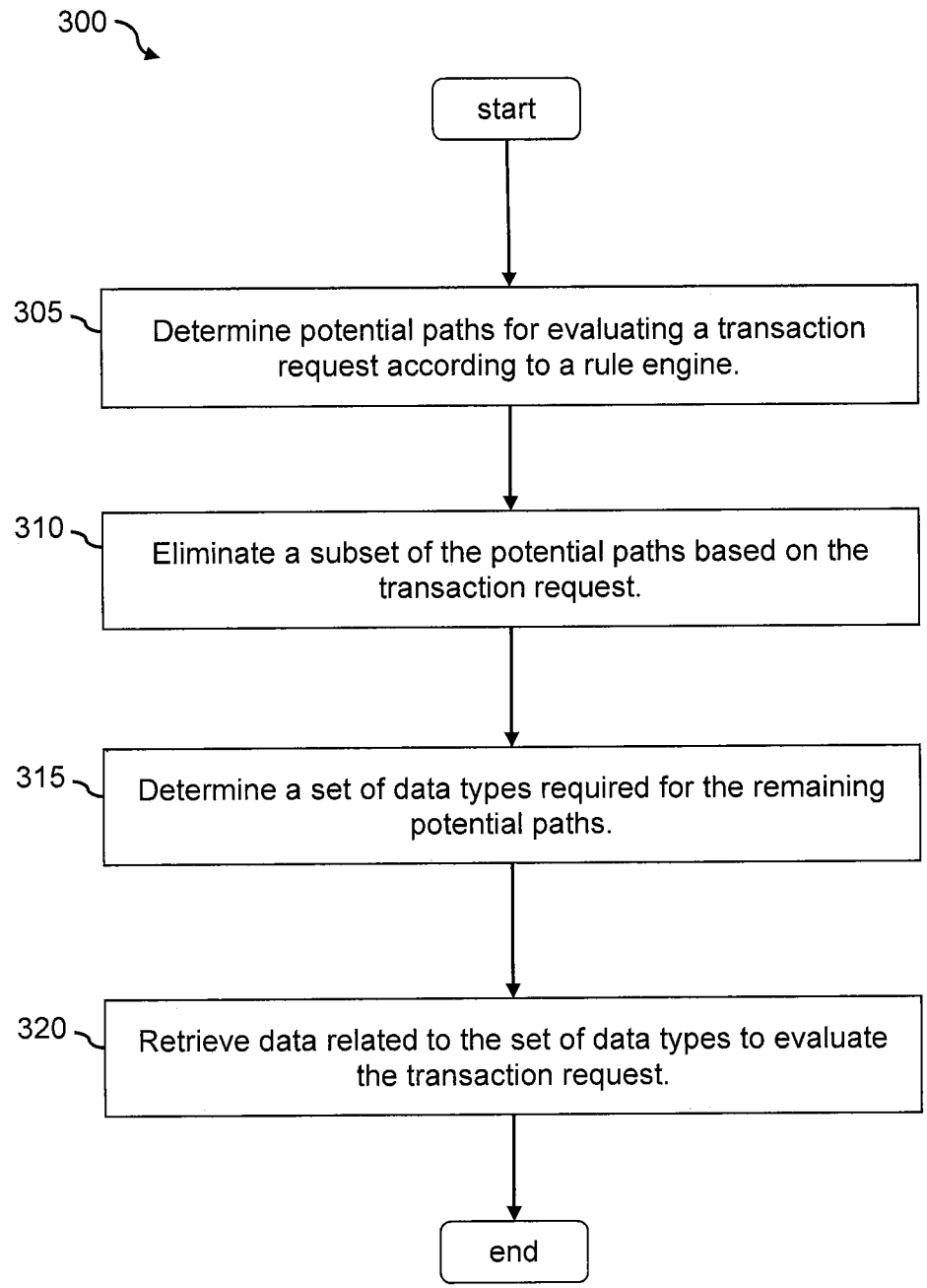
FIG. 3 is a flowchart showing a process of discovering data types required by a computer-based rule engine for evaluating a transaction request according to an embodiment of the present disclosure.

In some embodiments, prior to evaluating the transaction request by the rule engine 206, the rule set analyzer 204 may determine the types of data related to the transaction request that may be required by the rule engine 206 for evaluating the transaction request using the techniques described herein. FIG. 3 illustrates a process 300 for evaluating a transaction request according to an embodiment of the disclosure. In some embodiments, the process 300 may be performed by the risk analysis module 132 of the service provider server 130. The process 300 begins by determining (at step 305) potential paths for evaluating a transaction request according to a rule engine.

Different embodiments may use different techniques to determine the different potential paths for evaluating a transaction request according to the rule engine. For example, as discussed above, the rule set analyzer 204 of some embodiments may generate an abstract syntax tree for the rule engine 206 based on parsing the rules (or software instructions containing the rules) in the rule engine 206. The abstract syntax tree comprises nodes that are connected together, where each node includes a set of conditions. Nodes that are connected serially form a path for evaluating a transaction request. When a node is being traversed, the set of conditions associated with the node is assessed based on data related to the transaction request. Based on the data related to the transaction request, the rule engine 306 may determine whether the set of conditions is satisfied, and then move on to a subsequent (successor) node in a path. When the node is connected to more than one successor node, the rule engine 306 may determine which path (which subsequent node) to take based on whether the set of conditions is satisfied.

Figure 4:
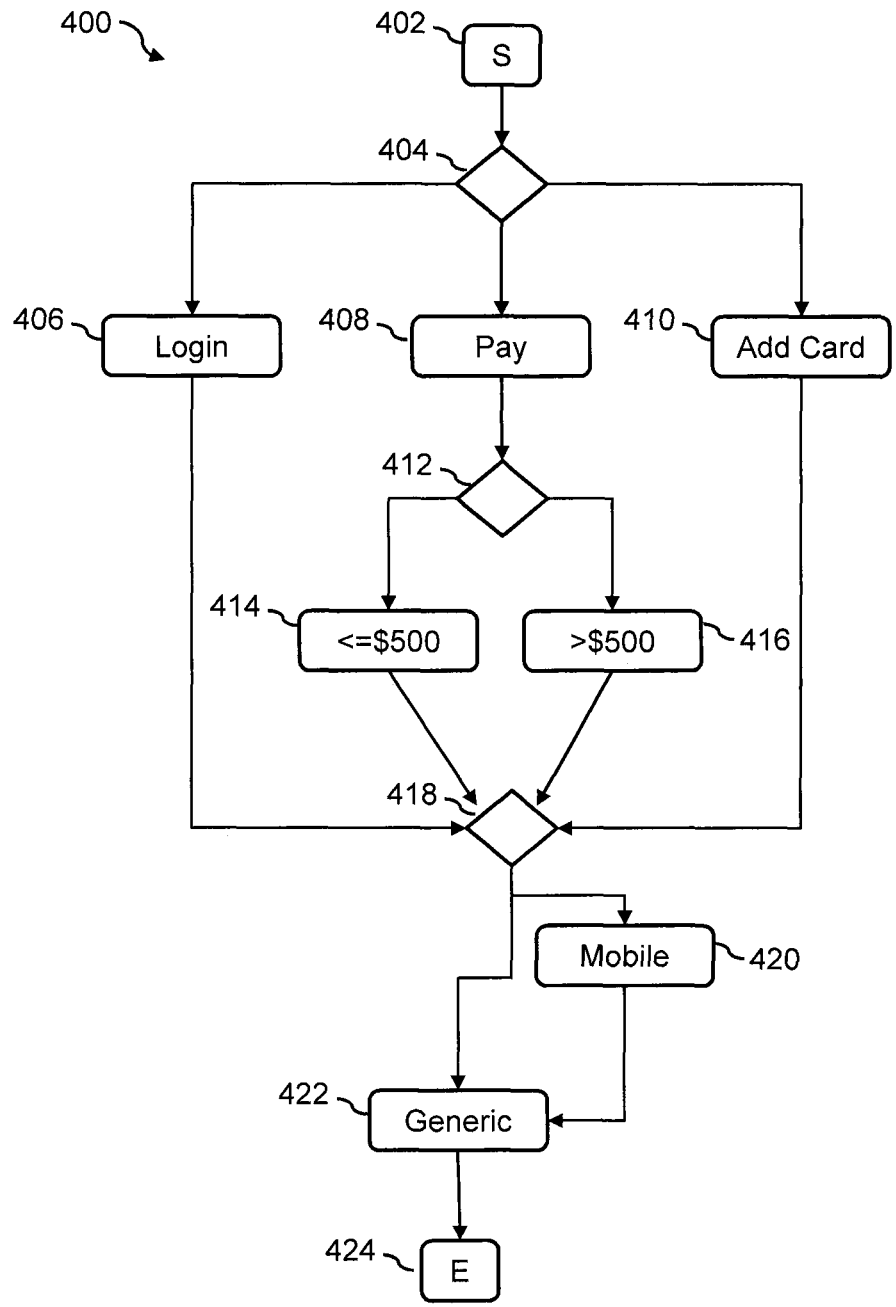
FIG. 4 illustrates an exemplary abstract syntax tree according to an embodiment of the present disclosure.

FIG. 4 illustrates an exemplary abstract syntax tree 400 according to an embodiment of the disclosure. The abstract syntax tree 400 may be generated by the rule set analyzer 204 by parsing the rule engine 206. As shown, the abstract syntax tree includes a start node 402 and an end node 424. When a transaction request is being evaluated, the rule engine 206 begins the evaluation at the start node 402. The start node 402 is connected to only one node 404, so the rule engine 206 may continue along the path to traverse the node 404. The node 404 is connected to three different successor nodes 406, 408, and 410. As such, the rule engine 206 may use information related to the transaction request to assess the set of conditions of the node 404. Based on the result from assessing the set of conditions of the node 404, the rule engine 206 may take a path that leads to the node 406, a path that leads to the node 408, or a path that leads to the node 410. In this example, the set of conditions may include a condition of whether the transaction request is a login request, a condition of whether the transaction request is a payment transaction request, and a condition of whether the transaction request is a request to add a funding source to a user account. When it is determined that the transaction request is a login request, the rule engine 206 may take the path that leads to the node 406.

After evaluating the process request under the node 406, the path leads to the node 418. Similar to the node 404, the node 418 is connected to more than one successor node. In this example, the node 418 is connected to two nodes: a node 420 and a node 422. As such, the rule engine 206 may use information related to the transaction request to assess the set of conditions of the node 418. Based on the result from assessing the set of conditions of the node 418, the rule engine 206 may take a path that leads to the node 420 or a path that leads to the node 422. In this example, the set of conditions may include a condition of whether the transaction request is initiated from a mobile device or not. When it is determined that the transaction request is not initiated from a mobile device, the rule engine 206 may take the path that leads to the node 422, and then reaching the end node 424. At the end node, the rule engine 206 may generate an outcome based on evaluation performed along the path that traverses the nodes 402, 404, 406, 418, 422, and 424.

On the other hand, if it is determined that the transaction request is generated from a mobile device, the rule engine 206 may take the path that leads to the node 420, which then reverts back to the node 422. The path then leads to the end node 424, at which point the rule engine 206 may generate an outcome based on the evaluation performed along the path that traverses the nodes 402, 404, 406, 418, 420, 422, and 424.

Referring back to the node 404, when it is determined that the transaction request is a payment transaction request, the rule engine 206 may take the path that leads to the node 408. After the node 408, the path then reaches the node 412, which connects to two different nodes—414 and 416. As such, the rule engine 206 may use information related to the transaction request to assess the set of conditions of the node 412. Based on the result from assessing the set of conditions of the node 412, the rule engine 206 may take a path that leads to the node 414 or a path that leads to the node 416. In this example, the set of conditions may include a condition of whether the payment transaction request involves an amount that is larger than $500 or not. When it is determined that the payment transaction request involves an amount larger than $500, the rule engine 206 may take the path that leads to the node 416, which leads to the node 418. The rule engine 206 then performs similar process as described above before reaching the end node 424, at which point, the rule engine may generate an outcome based on evaluation performed either along the path that traverses the nodes 402, 404, 408, 412, 416, 418, 422, and 424 or the path that traverses the nodes 402, 404, 408, 412, 416, 418, 420, 422, and 424.

On the other hand, if it is determined that the payment transaction request involves an amount that is less than or equal to $500, the rule engine 206 may take the path that leads to the node 414, which leads to the node 418. The rule engine 206 then performs similar process as described above before reaching the end node 424, at which point, the rule engine may generate an outcome based on evaluation performed either along the path that traverses the nodes 402, 404, 408, 412, 414, 418, 422, and 424 or the path that traverses the nodes 402, 404, 408, 412, 414, 418, 420, 422, and 424.

Referring back to the node 404, when it is determined that the transaction request is a request for adding an additional funding source, the rule engine 206 may take the path that leads to the node 410, which leads to the node 418. The rule engine 206 then performs a similar process as described above before reaching the end node 424, at which point, the rule engine may generate an outcome based on evaluation performed either along the path that traverses the nodes 402, 404, 410, 418, 422, and 424 or the path that traverses the nodes 402, 404, 410, 418, 420, 422, and 424.

By traversing the entire abstract syntax tree 400, the rule set analyzer 204 may determine that there are eight potential paths in total for evaluating a transaction request according to the rule engine 206. The rule set analyzer 204 may then retrieve information related to each potential path and store the information in a data structure. The information related to each path may include the conditions in which a transaction request must satisfy in order to traverse such a path.

FIG. 5 illustrates an example data structure 500 for storing information related to the potential paths from the abstract syntax tree 400. In this example, the data structure 500 is shown to be in a table format. However, it has been contemplated that the rule set analyzer 204 may use other types of data structure (e.g., an XML file, a database, a text file, etc.). As shown, the data structure 500 includes eight rows 502-516, where each row represents a distinct potential path according to the rule engine 206. For example, the row 502 represents 'Path 1' that traverses the nodes 402, 404, 406, 418, 420, 422, and 424, the row 504 represents 'Path 2' that traverses the nodes 402, 404, 410, 418, 422, and 424, the row 506 represents 'Path 3' that traverses the nodes 402, 404, 408, 412, 416, 418, 420, 422, and 424, the row 508 represents 'Path 4' that traverses the nodes 402, 404, 408, 412, 414, 418, 420, 422, and 424, the row 510 represents 'Path 5' that traverses the nodes 402, 404, 408, 412, 416, 418, 422, and 424, the row 512 represents 'Path 6' that traverses the nodes 402, 404, 408, 412, 414, 418, 422, and 424, the row 514 represents 'Path 7' that traverses the nodes 402, 404, 410, 418, 420, 422, and 424, and the row 516 represents 'Path 8' that traverses the nodes 402, 404, 410, 418, 422, and 424.

The data structure 500 also includes four columns 518-524. The first three columns 518-522 represent the conditions that must be satisfied for the rule engine 206 to take the corresponding path. For example, the column 518 represents the condition (in the node 404) of what transaction type (e.g., a login transaction type, a payment transaction type, a funding source addition transaction type) is associated with the transaction request, the column 520 represents the condition (in the node 418) of whether the transaction request is initiated from a mobile device, and the column 522 represents the condition (in the node 412) of whether an amount involved in a payment transaction request is more than $500. In this example, in order for the rule engine to take 'Path 1,' the transaction request must be a login request and the request must be initiated from a mobile device.

The last column 524 represents the types of data required under each path. By traversing the potential paths in the abstract syntax tree 400, the rule set analyzer 204 may collect information related to the data types required to assess the conditions along each path, and store the information in the data structure 500.

Referring back to FIG. 3, the process 300 then eliminates (at step 310) a subset of the potential paths based on information extracted from the transaction request. Continuing with the example described above, based on the information stored in the data structure 500, the rule set analyzer 204 may eliminate one or more paths based on information that indicates one or more of (i) a transaction type of the transaction request, (ii) whether the device that initiates the transaction request is a mobile device, or (iii) if the request is a payment transaction request, whether an amount involved in the payment transaction is larger than $500. As discussed above, some types of the information may be obtained quicker (or more easily) than other types of information. For example, by extracting information related to a transaction type from the transaction request (which can be easily extracted from the transaction request itself without retrieving addition information from other sources), one can immediately eliminate at least two of the eight paths. In some embodiments, the rule set analyzer 204 may obtain more information related to the transaction request (e.g., information retrieved from an internal source within the service provider server 130) in order to eliminate additional paths.

Thus, upon receiving a transaction request (e.g., from a user device via the web server 134), the rule set analyzer 204 may extract information directly from the transaction request. In this example, the rule set analyzer 204 may be able to extract the transaction type related to the transaction request from the transaction request itself without retrieving information from other sources. Based on the information extracted from the transaction request, the rules set analyzer 204 may eliminate one or more potential paths from the data structure 500. For example, when the transaction request is determined to be related to a login transaction, the rule set analyzer 204 may eliminate Path 3 through Path 8 (6 paths).

After eliminating one or more potential paths, the process 300 then determines a set of data types required by the rule engine for evaluating the transaction request under the remaining potential paths. For example, when the rule set analyzer 204 has eliminated Path 3 through Path 8, the rule set analyzer 204 may determine the set of data types required by the rule engine 206 to evaluate the transaction under Path 1 and Path 2. As discussed above, in addition to the condition information, the rule set analyzer 204 may also store the data types that are required to evaluate the transaction request under each path in the data structure 500. As shown in FIG. 5, the column 524 represents the types of data required under each path. As such, after eliminating Path 3 through Path 8, the rule set analyzer 204 may retrieve the data types required for Path 1 and Path 2—the data type set 1 and the data type set 2 from the data structure 500.

The process 300 then retrieves (at step 320) the data according to the determined data types required for the remaining potential paths (relevant data types) for evaluating the transaction request. Continuing with the example described above, the rule set analyzer 204 may retrieve data according to the data types specified in the data type set 1 and the data type set 2 for evaluating the transaction request through either Path 1 or Path 2 depending on whether the request was initiated from a mobile device (Path 1) or not (Path 2). The data corresponding to the data types that are determined to be relevant to evaluating the transaction request may include various types of data and may be obtained from a variety of sources. For example, some of the data may be extracted from the transaction request itself (e.g., a user account associated with the transaction request, payment amount, transaction type, IP address of the source device, etc.). The risk set analyzer 204 may then extract the data directly from the transaction request.

Some of the data may be obtained from the user device that initiates the transaction request (e.g., browser type, a geographical location of the user device that initiates the transaction request, whether the user device is a mobile device, etc.). To obtain the data from the user device, the rule set analyzer 204 may coordinate with the web server 134 to request such data from the user device (e.g., from the location component 118 or the UI application 112 of the user device 110). Some of the data may be obtained from other modules and/or databases within the service provider server (e.g., transaction history of the user, transaction attempt history of the user, a number of funding sources associated with a user account, locations of user when initiating past transactions, etc.). The risk set analyzer 204 may send requests to other modules/databases such as the accounts database 136 and/or the service application 138 for retrieving such information related to the transaction request. Furthermore, some of the data may be obtained from an external source, such as a credit bureau and/or from the merchant server 120 (e.g., transaction history of the user account with the merchant, user activity history with the merchant, a credit score of the user, etc.). The risk set analyzer 204 may obtain the data by transmitting a request to an external server (e.g., the merchant server 120) for the information related to the transaction request.

As discussed above, some of the data may take longer time to retrieve than others. For example, information that needs to be retrieved over the network 160, such as information from the user device 110 and information from the merchant server 120 or other external sources may take longer time to retrieve than information that the risk set analyzer 204 may extract directly from the transaction request or obtained from an internal source such as the accounts database 136. By eliminating one or more potential paths from the rule engine, it has been contemplated that less information is required to be obtained before evaluating the transaction request by the rule engine 206, thereby reducing pre-processing time and resources. Thus, after retrieving only the data that is determined to be relevant to the transaction request, the transaction request along with the retrieved data is sent to the rule engine for evaluating the transaction request. Since all the data that is required under the paths that the rule engine 206 may traverse based on the transaction data is already available, the processing time by the rule engine 206 for evaluating the transaction request is reduced. The rule engine 206 may generate an outcome based on evaluating the transaction request, and sends the outcome to the web server 134 and/or the service application 138 such that the web server 134 and/or the service application 138 may process (e.g., approve or deny) the transaction request accordingly.

In some embodiments, the rule set analyzer 204 may store the data structure 500 as metadata 208 of the rule engine 206 such that the rule set analyzer 204 may use it for subsequent transaction requests. The rule set analyzer 204 may re-generate (or update) the data structure 500 periodically or when it is detected that the rules/conditions in the rule engine may have changed (e.g., when the rule engine is modified).

The description above illustrates various embodiments for eliminating unnecessary loading and/or retrieval of data that is determined to be irrelevant for evaluating a transaction request by pruning one or more branches of an abstract syntax tree of a rule engine. However, since only a limited amount of information related to the transaction request is available to make such a determination, the elimination may not be optimal. That is, at least some of the data determined to be relevant for the transaction request may still end up unused by the rule engine in evaluating the transaction request. For example, the rule engine may include a rule for performing an action (e.g., returning an outcome indicating a non-fraudulent transaction request) if at least one of the following conditions (Condition 'A,' Condition 'B,' Condition 'C,' and Condition 'D') is present. In this example, if Condition 'A' is determined to be present, there is no need for the rule engine to assess Condition 'B,' Condition 'C,' and Condition 'D,' and accordingly, the data required for assessing Condition 'B,' Condition 'C,' and Condition 'D' are not needed in evaluating the transaction request. If the rule engine loads only data required for assessing Condition 'A' and does not load data required for assessing Condition 'B,' Condition 'C,' and Condition 'D,' the performance can be improved.

As such, in another aspect of the disclosure, a technique for automatically determining a data loading configuration for the rule engine in evaluating a particular category of transaction requests is presented to further improve the performance of the rule engine. In some embodiments, the data loading configuration may configure the rule engine to pre-load (also referred to as pre-fetch) data related to a first set of data types and to lazy-load data related to a second set of data types when evaluating a transaction request associated with the particular category. In some embodiments, the first set of data types and the second set of data types include data types that are determined to be relevant, e.g., needed or required, in evaluating transaction requests of the particular category. For example, the relevant data types may be determined using the techniques described above by reference to FIG. 3.

In some embodiments, the rule engine pre-loads data by retrieving the data from the corresponding data source(s) prior to evaluating the transaction request (e.g., prior to or at the start node 402 in the abstract syntax tree 400 of FIG. 4). On the other hand, the rule engine performs a lazy loading of data by retrieving the data from the corresponding data source(s) at the time the data is needed by the rule engine in evaluating the transaction request (e.g., does not retrieve prior to evaluating the transaction request). For example, when the rule engine arrives at node 418 of the abstract syntax tree 400 during the processing of a transaction request, the rule engine may be required to assess a condition associated with node 418 and may determine that a particular piece of data is required for assessing the condition. The rule engine may then retrieve the particular piece of data during the processing performed at node 418 under a lazy-loading approach.

One of the benefits of pre-loading data is that the data is readily available to the rule engine when needed. Although pre-loading the data may delay the actual processing of the transaction request (e.g., the rule engine must wait until the data is pre-loaded before starting to process the transaction request), since retrieval of various data from the data sources can be performed in parallel (as the retrieval of the data is not dependent on each other), the overall performance may be improved from the pre-loading if all or most of the pre-loaded data is actually used by the rule engine. However, when some of the pre-loaded data is unused by the rule engine, the overall performance of the rule engine may be reduced by pre-loading the data. The reduction of performance is especially apparent when the cost of loading a type of data is high (e.g., the time to load the type of data is long) and the use rate of the type of data is low.

Lazy-loading data avoids such a pitfall by retrieving the data only when it is absolutely needed. However, it also means that the data is not readily available when needed by the rule engine, causing the rule engine to frequently idle when the data is being loaded, which may reduce the performance of the rule engine. As such, a strategic combination of pre-loading some types of data and lazy-loading other types of data may provide substantial improvement to the performance of the rule engine. For example, the performance of the rule engine may be improved by pre-loading data that has a higher likelihood of being used by the rule engine in evaluating a transaction request and lazy-loading data that has a lower likelihood of being used by the rule engine.

Various factors may be considered when determining the data loading configuration. In some embodiments, the use rate of a particular type of data for the particular category of transaction requests may be considered when determining whether to pre-load or lazy-load the particular type of data. The use rate may be computed based on the frequency in which the particular data type is used by the rule engine in evaluating transaction requests of the particular category in the past. For example, if the particular data type is used by the rule engine for evaluating the transaction requests 9 times out of the past 10 evaluations, a use rate of 90% may be computed. Furthermore, the use rate may be computed based on the frequencies across different time periods. The frequencies computed for recent time periods may be given more weight than the frequencies computed for older time periods. In some embodiments, the data loading configuration may configure the rule engine to pre-load the particular type of data when the particular type of data has a high use rate (e.g., above a certain threshold) and to lazy-load the particular type of data when the particular type of data has a low use rate (e.g., below a certain threshold).

Instead of or in addition to the use rates, the cost of loading the particular type of data may be considered when determining whether to pre-load or lazy-load the particular type of data. The cost can be defined by the time it takes to load the particular type of data. As discussed above, some types of data may take longer time to retrieve than others. For example, information that needs to be retrieved over the network 160, such as information from the user device 110 and information from the merchant server 120 or other external sources may take longer time to retrieve than information that the risk analysis module 132 may extract directly from the transaction request or obtained from an internal source such as the accounts database 136. In some instances, the data retrieval time for retrieving data from different internal sources may vary as well, and the time to retrieve data from one internal source may be larger (or even significantly larger) than the time to retrieve data from another internal source. The time taken for the risk analysis module 132 to load the particular type of data when evaluating previous transaction requests may be used to compute the cost. Furthermore, since the time to retrieve data may be affected by the network traffic, times that are recorded recently for retrieving the particular type of data may be given more weight than other recorded times. In some embodiments, the data loading configuration may configure the rule engine to pre-load the particular type of data when the particular type of data is associated with a low cost (the penalty of loading the particular type of data even when it is ultimately not used by the rule engine is low) and to lazy-load the particular type of data when the particular type of data is associated with a high cost (e.g., above a threshold time). In some embodiments, the data loading configuration may take into consideration both of the use rate and cost, and may configure the rule engine to pre-load the particular type of data even when the particular type of data is associated with a high cost, especially when the use rate of the particular type of data is high.

Other factors that may impact the performance of the rule engine based on different data loading configurations include the hardware components of the machine (or the virtual machine) on which the risk analysis module 132 is running, such as the number of processing cores, the size of available memory on the machine (or the virtual machine), etc.

In some embodiments, information related to these factors gathered from processing the past transaction requests may be provided to a machine learning module (e.g., an artificial neural network). With sufficient training data, the machine learning module can be trained to provide a data loading configuration customized for a transaction request that improves the performance of the rule engine.

Figure 6:
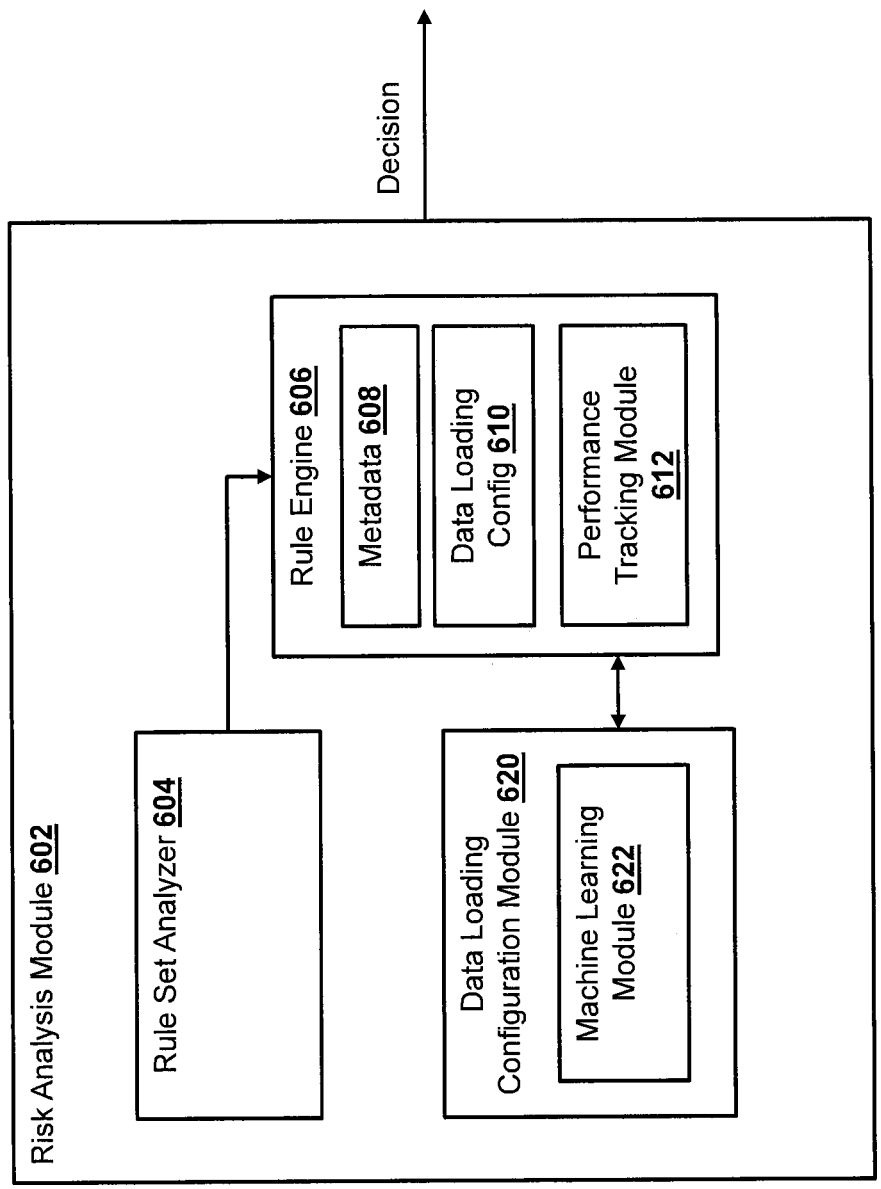
FIG. 6 is a block diagram illustrating a risk analysis module according to another embodiment of the present disclosure.

FIG. 6 illustrates a risk analysis module 602, which is similar to the risk analysis module 132 and can also reside in the service provider server 130 (in addition to the risk analysis module 132 or to replace the risk analysis module 132) to provide risk analysis services for transaction requests received by the service provider server 130. As shown, the risk analysis module 602 includes a rule set analyzer 604, a rule engine 606, and a data loading configuration module 620. The rule engine 606 may be implemented similarly as the rule engine 206. In some embodiments, the rule engine 606 is a computer-based rule engine and may include multiple different sets of rules and/or conditions for evaluating a transaction request. When a transaction request is received by the risk analysis module 602 (e.g., a user initiated request received via the web server 134), the rule engine 606 may use at least some of the different sets of conditions to evaluate the transaction request in order to generate an outcome. As discussed above, in some embodiments, based on whether some of the conditions are satisfied or not (using the data related to the transaction request), the rule engine 606 may generate an outcome that indicates whether the request is possibly an unauthorized/fraudulent request. The outcome may be a binary outcome or a score that indicates a likelihood of whether the request is possibly an unauthorized/fraudulent request. The outcome may be transmitted to other modules of the service provider server 130, such as the web server 134 and/or the service application 138, such that these other modules may process (e.g., approve or deny) the transaction request accordingly.

The rule set analyzer 604 can be implemented as the rule set analyzer 204 to analyze the rules in the rule engine 606 and determine the types of data related to the transaction request that may be required by the rule engine 606 for evaluating the transaction request using the techniques described above by reference to FIG. 3. As such, the rule set analyzer 604 may generate an abstract syntax tree (such as the abstract syntax tree 400) and a data structure (e.g., the data structure 500) that includes different data types required to process a transaction request by the rule engine 606 under each of the processing paths identified in the abstract syntax tree 400 based on analyzing the rule engine 606. The rule set analyzer 604 may also store the abstract syntax 400 and the data structure 500 as metadata 608 in the rule engine 606.

As shown, the rule engine 606 also includes a performance tracking module 612. In some embodiments, the performance tracking module tracks information related to the processing of each transaction request by the rule engine 606. The information tracked for processing a transaction request may include the type of transaction request that is being processed (e.g., a login request, a payment transaction request, a fund withdrawal request, etc.), the time it takes to load data associated with each data type for the transaction request, whether the data associated with each data type was ultimately used by the rule engine 606 in evaluating the transaction request, the overall performance of the rule engine 606 in evaluating the transaction request, the time for pre-loading the data (if data is pre-loaded), and other relevant information. The tracked information may be stored by the rule engine 606 and/or provided to the data loading configuration module 620.

In some embodiments, the data loading configuration module 620 may use the tracked information provided by the rule engine 606 to determine one or more data loading configurations for the rule engine 606. The data loading configuration module 620 may provide the one or more data loading configurations to the rule engine 606, and stored in the rule engine 606 as the data loading configurations 610. When a new transaction request is provided to the rule engine 606, the rule engine 606 may then loads data to evaluate the transaction request according to the data loading configurations 610.

Figure 7:
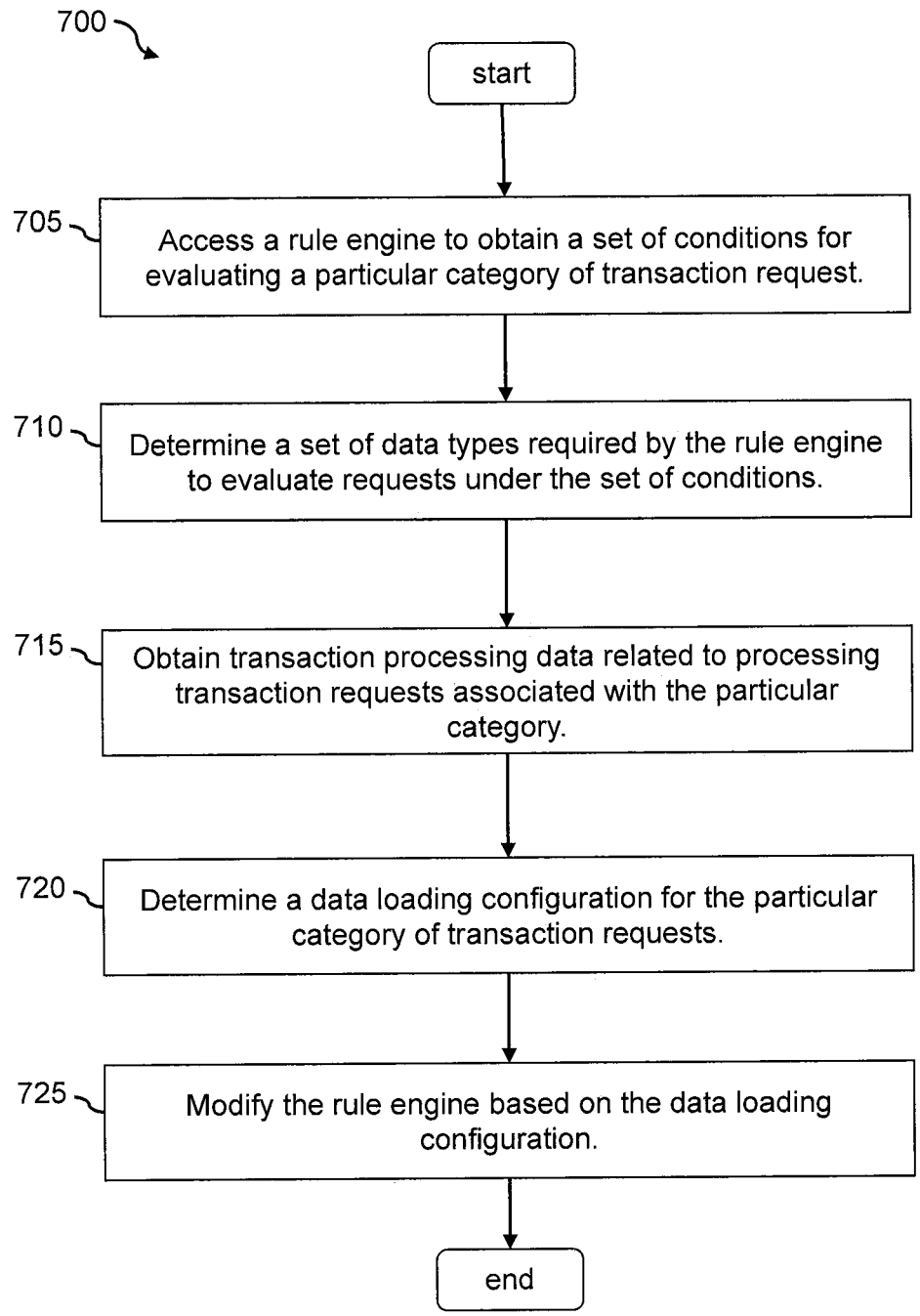
FIG. 7 is a flowchart showing a process of determining a data loading configuration for a rule engine according to an embodiment of the present disclosure.

FIG. 7 illustrates a process 700 for determining a data loading configuration for a rule engine. In some embodiments, the process 700 may be performed by the data loading configuration module 620, and the resulting data loading configuration may then be provided to the rule engine 606. As discussed above, the data loading configuration determined for a rule engine may configure the rule engine to pre-load data associated with a first data type and lazy-load data associated with a second data type. In some embodiments, the data loading configuration may be determined for all transaction requests processed by the rule engine 606. However, since different categories of transaction requests may have different data loading requirements (e.g., the use rates of various data types may be different between different categories of transaction requests), in some other embodiments, the process 700 may be performed to determine a data loading configuration specifically for a particular category of transaction requests.

In some embodiments, the transaction requests may be classified into different categories based on the types of the transaction requests. For example, one category may be associated with only login requests and another category may be associated only with payment transaction requests. Furthermore, the transaction requests may also be classified according to characteristics of the users who initiated the requests. In some embodiments, the login requests may be further classified into sub-categories based on the demographics of the users who initiated the login requests. For example, one category may be associated with login requests made by male users and another category may be associated with login requests made by female users. While the following description of the process 700 refers to determining a data loading configuration for a specific category of transaction requests, it has been contemplated that the same process 700 may be performed to determine a general data loading configuration for all transaction requests received by the rule engine.

The process 700 begins by accessing (at step 705) a rule engine to obtain a set of conditions for evaluating transaction requests. For example, the data loading configuration module 620 may access the rule engine 606 to obtain different conditions for evaluating transaction requests. In some embodiments, the data loading configuration module 620 (or the rule set analyzer 204) may analyze the rule engine to determine the different conditions in a similar manner as described above by reference to FIG. 4. For example, the data loading configuration module 620 may parse the software codes associated with the rule engine 606 to generate an abstract syntax tree (e.g., the abstract syntax tree 400) if it has not been generated and stored as the metadata 608 already by the rule set analyzer 604. Based on characteristics of the transactions and/or the users associated with the particular category of transactions, the data loading configuration module 620 analyzes the abstract syntax tree to identify conditions that the rule engine may assess in evaluating transaction requests of the particular category. In some embodiments, the data loading configuration module 620 may traverse the abstract syntax tree 400 to identify nodes that the rule engine may encounter when evaluating transaction requests of the particular category. For example, when the particular category is associated with login requests, the data loading configuration module 620 may follow the data paths that the rule engine may traverse when processing transaction requests of the particular category, and may identify nodes 404, 406, 418, 420, and 422 as the nodes that the rule engine may encounter.

As discussed above, each of the nodes 404, 406, 418, 420, and 422 may include one or more conditions that the rule engine uses to evaluate the transaction requests. For example, node 406 may be associated with a conditional statement such as "if Condition 'A' or Condition 'B' or Condition 'C' or Condition 'D' is present, perform the following action." Node 418 may include a conditional statement such as "if Condition 'E' and Condition 'F' are present, perform the following action." The data loading configuration module 620 may then obtain Condition 'A,' Condition 'B,' Condition 'C,' Condition 'D,' Condition 'E,' and Condition 'F' to be associated with this particular category of transaction requests.

After obtaining the set of conditions, the process 700 then determines (at step 710) a set of data types required by the rule engine to evaluate the transaction requests under the set of conditions. For example, Condition 'A' requires a number of failed login attempts in the past 6 months, the data loading configuration module 620 may then determine that the data type of past failed login attempts may be required by the rule engine to evaluate transaction requests of the particular category. Other data types that may be required by the rule engine to evaluate transaction requests may include an Internet Protocol (IP) address of a source of the transaction request, a number of successful transactions within a predetermined period of time, a number of failed transactions within the predetermined period of time, a time, a browser type, a device type, an amount associated with the transaction, a transaction type of the transaction, and other types of data related to evaluating a transaction request. The data loading configuration module 620 may then store the information related to the required data types for the particular category of transaction requests in a data structure similar to the data structure 500 of FIG. 5. Alternatively, if the data structure 500 is already available (e.g., generated by the rule set analyzer 604), the data loading configuration module 620 may directly access the data structure 500 instead of performing the analyzing steps as described above.

In step 715, the process 700 obtains transaction processing data related to processing transaction requests of the particular category. The transaction process data includes information associated with accessing data of different data types when processing the transaction requests of the particular category by the risk analysis module 602. For example, the transaction process data may include whether data of a data type is used during processing of a transaction request, the time it takes to load the data of the data type, the hardware/software components (e.g., the number of processing cores, the availability of a virtual machine, etc.) of the machine that implements the risk analysis module 602 when the transaction request is processed, and other data that is tracked when the transaction request is processed. In some embodiments, at least some of the information may be tracked and stored by the performance tracking module of the rule engine 606 as discussed above, and may be accessed by the data loading configuration module 620.

Based on the transaction processing data, the data loading configuration module 620 may derive statistical data such as a use rate of a specific data type, an average load time for a specific data type, and how different hardware/software configurations affect the load time, etc. for various data types required for the particular category of transaction requests. The statistical data may then be used to determine (at step 720) a data loading configuration for the particular category of transaction requests.

In some embodiments, the derived statistical data may be fed into a machine learning module 622 to generate the data loading configuration. In some of these embodiments, the machine learning module 622 may obtain (provided by the data loading configuration module 620) the statistical data related to a particular data type, and generate an output that indicates whether the pre-load or lazy-load data of the particular data type by running the statistical data through a machine learning algorithm, such as an artificial neural network.

Figure 8:
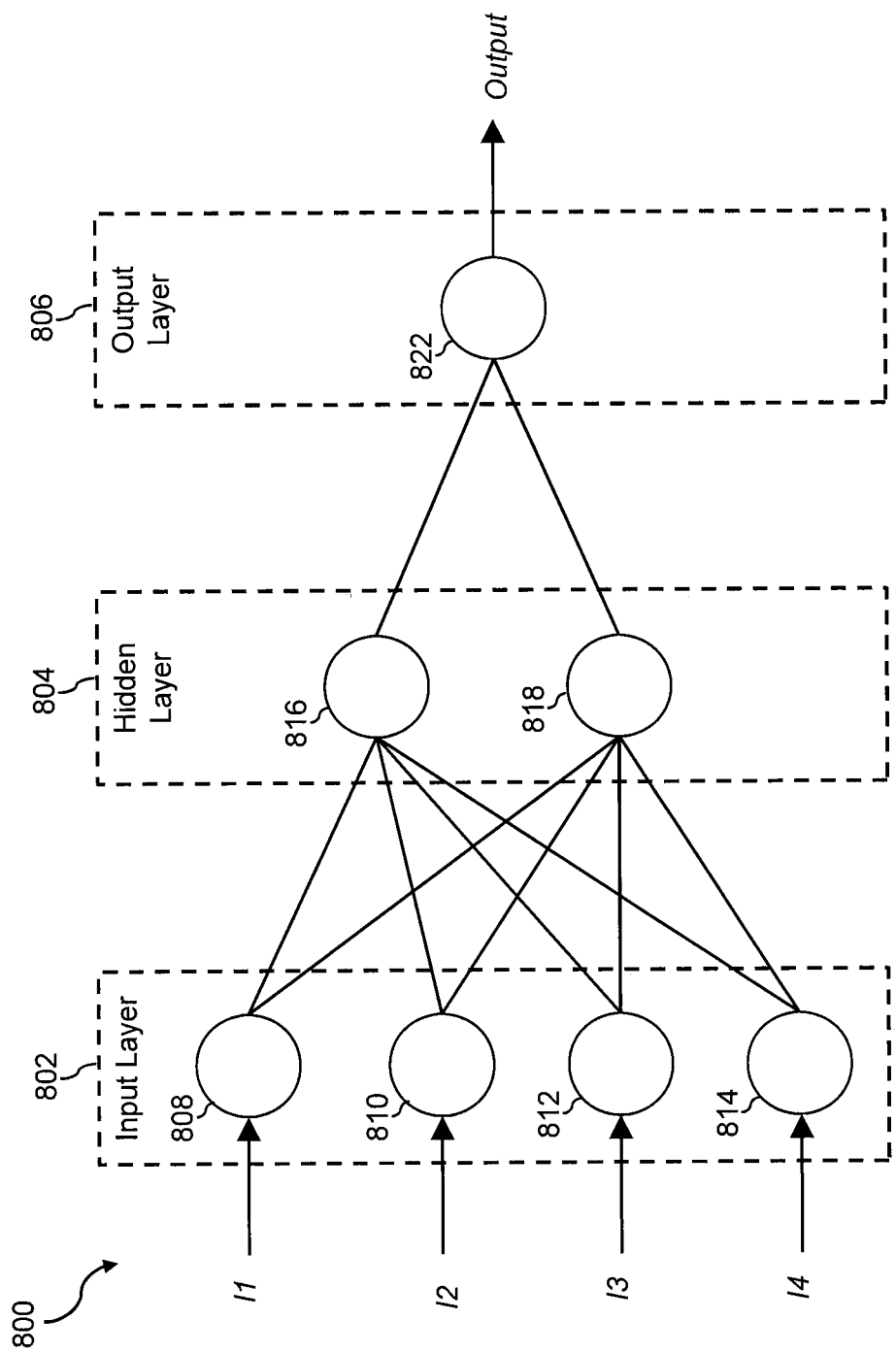
FIG. 8 illustrates an exemplary artificial neural network according to an embodiment of the present disclosure.

FIG. 8 illustrates an example artificial neural network 800 that the machine learning module 622 may use for generating the data loading configuration. As shown, the artificial neural network 800 includes three layers—an input layer 802, a hidden layer 804, and an output layer 806. Each of the layers 802, 804, and 806 may include one or more nodes. For example, the input layer 802 includes nodes 808-814, the hidden layer 804 includes nodes 816-818, and the output layer 806 includes a node 822. In this example, each node in a layer is connected to every node in an adjacent layer. For example, the node 808 in the input layer 802 is connected to both of the nodes 816-818 in the hidden layer 804. Similarly, the node 816 in the hidden layer is connected to all of the nodes 808-814 in the input layer 802 and the node 622 in the output layer 806. Although only one hidden layer is shown for the artificial neural network 800, it has been contemplated that the artificial neural network 800 used by the machine learning module 622 may include as many hidden layers as necessary.

In this example, the artificial neural network 800 receives a set of input values and produces an output value. Each node in the input layer 802 may correspond to a distinct input value (e.g., a distinct statistical data for a particular data type). For example, the node 808 may correspond to a use rate of the particular data type, the node 810 may correspond to an average load time for the particular data type, the node 812 may correspond to the number of processing core, and the node 814 may correspond to the size of the available memory on a machine (or a virtual machine).

In some embodiments, each of the nodes 816-818 in the hidden layer 804 generates a representation, which may include a mathematical computation (or algorithm) that produces a value based on the input values received from the nodes 808-814. The mathematical computation may include assigning different weights to each of the data values received from the nodes 808-814. The nodes 816 and 818 may include different algorithms and/or different weights assigned to the data variables from the nodes 808-814 such that the nodes 816-818 may produce different values based on the same input values received from the nodes 808-814. In some embodiments, the weights that are initially assigned to the features (or input values) for each of the nodes 816-818 may be randomly generated (e.g., using a computer randomizer). The values generated by the nodes 816 and 818 may be used by the nodes 822 in the output layer 806 to produce an output value for the artificial neural network 800. In some embodiments, the output value produced by the artificial neural network 800 may indicate whether to pre-load or lazy-load the particular data type associated with the input values.

The artificial neural network 800 may be trained by using historical processing data (training data) that indicates how performance of the rule engine 606 may be impacted by pre-loading or lazy-loading certain data based on various statistical data. By providing training data to the artificial neural network 800, the nodes 816-818 in the hidden layer 804 may be trained (adjusted) such that an optimal output (a configuration of whether to pre-load or lazy-load the data type) is produced in the output layer 806 based on the training data.

By continuously providing different sets of training data, and penalizing the artificial neural network 800 when output configuration reduces the performance of the rule engine 606, the artificial neural network 800 (and specifically, the representations of the nodes in the hidden layer 804) may be trained (adjusted) to improve its performance in producing a data loading configuration that improves the performance of the rule engine 606 over time. Adjusting the artificial neural network 800 may include adjusting the weights associated with each node in the hidden layer 804.

In some embodiments, the machine learning module 622 may feed statistical data related to each particular data type to obtain a data loading configuration (e.g., whether to pre-load or lazy-load) for the particular type of data. As such, by feeding statistical data related to different data types, the machine learning module 622 may determine data loading configurations for the different data types associated with the particular category of transaction requests. Specifically, the determined data loading configurations may specify pre-loading data associated with a first data type and lazy-loading data associated with a second data type.

Once the data loading configurations for the different data types associated with the particular category of transaction requests are determined, the process 700 then modifies (at step 725) the rule engine based on the data loading configurations. In some embodiments, the data loading configuration module 620 may provide the data loading configurations to the rule engine 606. The newly generated data loading configurations may replace existing data loading configurations that have been stored in the rule engine 606. Furthermore, the data loading configurations may cause the rule engine 606 to load data according to the data loading configurations when processing any subsequent transaction requests of the particular category.

In some embodiments, the data loading configuration module 620 may perform the process 700 for all of the categories classified for the transaction requests such that the rule engine 606 would load data in the determined configurations when processing transaction requests of any category. It is noted that since the statistical data for a particular data type may be different for different categories of transaction requests (e.g., the use rate for a particular data type may be higher for one category of transaction requests than another category of transaction requests), the data loading configuration may specify to pre-load data associated with the particular data type for the one category of transaction requests and to lazy-load data associated with the same particular data type for the other category of transaction requests.

Since the different performance data, such as use rate, time to load, hardware/software configurations may change over time, it has been contemplated that the process 700 may be performed periodically (e.g., every six months, every month, every week, etc.) and the data loading configurations 610 stored in the rule engine 606 may be updated.

In addition, instead of performing the process 700 offline, in some embodiments, the process 700 may be performed by the data loading configuration module online, as the risk analysis module 602 receives a new transaction request. For example, when the risk analysis module 602 receives a transaction request of a particular category, the data loading configuration module 620 may determine the statistical data (e.g., the use rates, the times to load, etc.) of the different data types associated with the particular category based on the most updated data compiled by the rule engine 606. The data loading configuration module 620 may then perform the process 700 with the statistical data to generate the data loading configurations. This way, the data loading configurations may take into account the latest performance of the rule engine, such that any recent network issues (e.g., reduced bandwidth or reduced networking speed) may be accounted for in generating the data loading configuration to ensure optimal performance of the rule engine 606.

Figure 9:
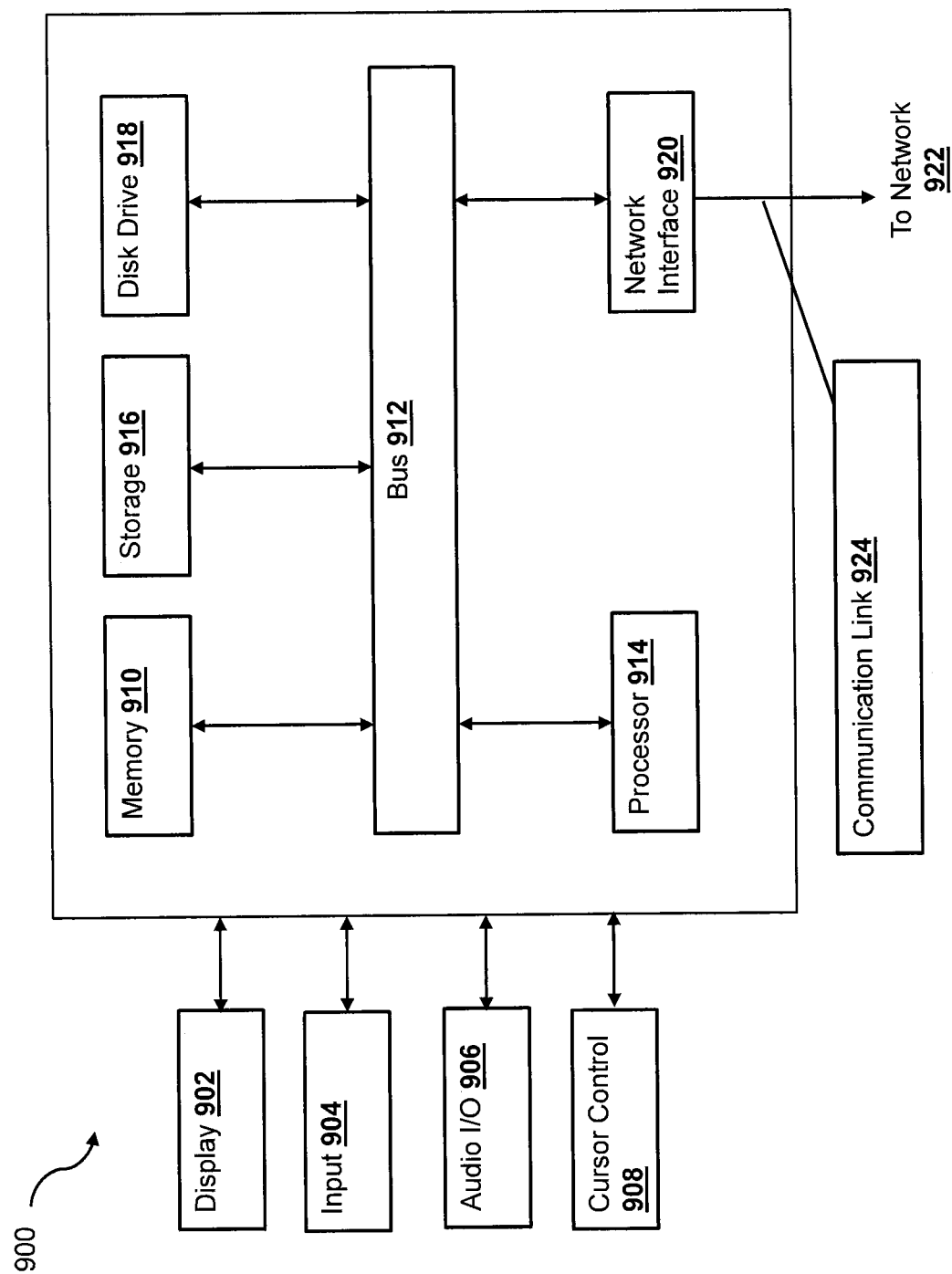
FIG. 9 is a block diagram of a system for implementing a device according to an embodiment of the present disclosure.

FIG. 9 is a block diagram of a computer system 900 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 900 in a manner as follows.

The computer system 900 includes a bus 912 or other communication mechanism for communicating information data, signals, and information between various components of the computer system 900. The components include an input/output (I/O) component 904 that processes a user (i.e., sender, recipient, service provider) action, such as selecting keys from a keypad/keyboard, selecting one or more buttons or links, etc., and sends a corresponding signal to the bus 912. The I/O component 904 may also include an output component, such as a display 902 and a cursor control 908 (such as a keyboard, keypad, mouse, etc.). The display 902 may be configured to present a login page for logging into a user account or a checkout page for purchasing an item from a merchant. An optional audio input/output component 906 may also be included to allow a user to use voice for inputting information by converting audio signals. The audio I/O component 906 may allow the user to hear audio. A transceiver or network interface 920 transmits and receives signals between the computer system 900 and other devices, such as another user device, a merchant server, or a service provider server via network 922. In one embodiment, the transmission is wireless, although other transmission mediums and methods may also be suitable. A processor 914, which can be a micro-controller, digital signal processor (DSP), or other processing component, processes these various signals, such as for display on the computer system 900 or transmission to other devices via a communication link 924. The processor 914 may also control transmission of information, such as cookies or IP addresses, to other devices.

The components of the computer system 900 also include a system memory component 910 (e.g., RAM), a static storage component 916 (e.g., ROM), and/or a disk drive 918 (e.g., a solid state drive, a hard drive). The computer system 900 performs specific operations by the processor 914 and other components by executing one or more sequences of instructions contained in the system memory component 910. For example, the processor 914 can perform the risk analysis functionalities described herein according to the processes 300 and 700.

Logic may be encoded in a computer readable medium, which may refer to any medium that participates in providing instructions to the processor 914 for execution. Such a medium may take many forms, including but not limited to, non-volatile media, volatile media, and transmission media. In various implementations, non-volatile media includes optical or magnetic disks, volatile media includes dynamic memory, such as the system memory component 910, and transmission media includes coaxial cables, copper wire, and fiber optics, including wires that comprise the bus 912. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of computer systems 900 coupled by the communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method for detecting fraudulent transactions by a service provider system, comprising:
   accessing, by one or more hardware processors associated with the service provider system, a computer-based transaction processing engine configured to process transaction requests using a transaction rule engine;
   receiving, by the one or more hardware processors, a request for processing a transaction from a requesting computing device;
   determining processing path exclusion information for the transaction based on an analysis of transaction processing data related to previous processing of a plurality of electronic transactions by the transaction rule engine, wherein the processing path exclusion information comprises one or more excluded data types of a plurality of data types usable for processing the transaction, wherein the processing path exclusion information indicates one or more excluded processing paths, out of a plurality of potential processing paths usable by the transaction rule engine in evaluating electronic transactions, that are determined to be unnecessary for the transaction rule engine to evaluate the transaction,
   wherein the service provider system is associated with a data loading configuration table having a data structure that stores the plurality of potential processing paths and specifies one or more data types required under each of the plurality of potential processing paths;
   wherein each of the plurality of potential processing paths comprises one or more evaluation nodes, and
   wherein each node in each of the plurality of potential processing paths includes one or more computing evaluations;
   based on the processing path exclusion information, determining a data loading scheme for the transaction, wherein the data loading scheme specifies a pre-loading of a first group of data items corresponding to a first subset of data types from the plurality of data types and a lazy-loading of a second group of data items corresponding to a second subset of data types from the plurality of data types;
   configuring the transaction rule engine to process the transaction based on the data loading scheme;
   processing, using the configured transaction rule engine, the transaction, wherein the processing comprises (i) loading the first group of data items, and not the second group of data items, for the transaction, (ii) evaluating the transaction using the loaded first group of data items, (iii) determining that a particular data item from the second group of data items is necessary for the evaluating, (iv) in response to determining that the particular data item is necessary for the evaluating, loading the particular data item, and (v) based on the loaded first group of data items and the loaded particular data item, generating a processing outcome for the transaction; and
   transmitting evaluation decision information indicating the processing outcome for the transaction.

2. The method of claim 1, further comprising:
   determining a first data type and a second data type associated with the transaction; and
   evaluating, based on the analysis of the transaction processing data related to the previous processing of the plurality of electronic transactions by the transaction rule engine, a first historical usage rate of the first data type and a second historical usage rate of second data type.

3. The method of claim 2, wherein the determining the data loading scheme comprises including a first data item corresponding to the first data type in the first group of data items based on the first historical usage rate and including a second data item corresponding to the second data type in the second group of data items based on the second historical usage rate.

4. The method of claim 1, further comprising:
   determining a first data type and a second data type associated with the transaction; and
   evaluating, based on the analyzing the transaction processing data related to the previous processing of the plurality of electronic transactions by the transaction rule engine, a first data loading cost for the first data type and a second data loading cost for the second data type.

5. The method of claim 4, wherein the determining the data loading scheme comprises including a first data item corresponding to the first data type in the first group of data items based on the first data loading cost and including a second data item corresponding to the second data type in the second group of data items based on the second data loading cost.

6. The method of claim 5, wherein the first data loading cost is above a threshold amount of fetch time.

7. The method of claim 1, wherein the transaction rule engine comprises a trained machine-learning classifier configured to evaluate a transaction risk of allowing the transaction to be processed.

8. The method of claim 1, wherein the transaction comprises at least one of a login request, a payment transaction request, or a funding source addition request.

9. The method of claim 1, wherein the transaction is a two-party transaction for an electronic funds transfer and is associated with a specified destination entity.

10. The method of claim 1, wherein the plurality of data types comprises at least one of an Internet Protocol (IP) address of a requester entity, a number of successful transactions within a predetermined period of time, a number of failed transactions within the predetermined period of time, a time, a browser type, a device type, an amount associated with the transaction request, or a transaction type of the transaction request.

11. A non-transitory computer-readable medium having stored thereon instructions that are executable by a computer system having a processor and a memory to cause the computer system associated with a service provider to perform operations comprising:

accessing a computer-based transaction processing engine configured to process transaction requests using a transaction rule engine;

receiving a request for processing a transaction from a requesting computing device;

determining processing path exclusion information for the transaction based on an analysis of transaction processing data related to previous processing of a plurality of electronic transactions by a transaction rule engine, wherein the processing path exclusion information comprises one or more excluded data types of a plurality of data types usable for processing the transaction, wherein the processing path exclusion information indicates one or more excluded processing paths, out of a plurality of potential processing paths usable by the transaction rule engine in evaluating electronic transactions, that are determined to be unnecessary for the transaction rule engine to evaluate the transaction, wherein the computer system is associated with a data loading configuration table having a data structure that stores the plurality of potential processing paths and specifies one or more data types required under each of the plurality of potential processing paths;

wherein each of the plurality of potential processing paths comprises one or more evaluation nodes, and wherein each node in each of the plurality of potential processing paths includes one or more computing evaluations;

based on the processing path exclusion information, determining a data configuration loading scheme for the transaction, wherein the data loading scheme specifies a pre-loading of a first group of data items corresponding to a first subset of data types from the plurality of data types and a lazy-loading of a second group of data items corresponding to a second subset of data types from the plurality of data types;

configuring the transaction rule engine to process the transaction based on the data loading scheme;

processing, using the configured transaction rule engine, the transaction, wherein the processing comprises (i) loading the first group of data items, and not the second group of data items, for the transaction, (ii) evaluating the transaction using the loaded first group of data items, (iii) determining that a particular data item from the second group of data items is necessary for the evaluating, (iv) in response to determining that the particular data item is necessary for the evaluating, loading the particular data item, and (v) based on the loaded first group of data items and the loaded particular data item, generating a processing outcome for the transaction; and transmitting evaluation decision information indicating the processing outcome for the transaction.

12. The non-transitory computer-readable medium of claim 11, wherein the operations further comprise:

determining a first data type and a second data type associated with the transaction; and evaluating, based on the analysis of the transaction processing data related to the previous processing of the plurality of electronic transactions by the transaction rule engine, a first historical usage rate of the first data type and a second historical usage rate of second data type.

13. The non-transitory computer-readable medium of claim 12, wherein the determining the data loading scheme comprises including a first data item corresponding to the first data type in the first group of data items based on the evaluating the first historical usage rate and including a second data item corresponding to the second data type in the second group of data items based on the evaluating the second historical usage rate.

14. The non-transitory computer-readable medium of claim 11, wherein the operations further comprise:

determining a first data type and a second data type associated with the transaction; and evaluating, based on the analysis of the transaction processing data related to the previous processing of the plurality of electronic transactions by the transaction rule engine, a first data loading cost for the first data type and a second data loading cost for the second data type.

15. The non-transitory computer-readable medium of claim 14, wherein the determining the data loading scheme comprises including a first data item corresponding to the first data type in the first group of data items based on the evaluating the first data loading cost and including a second data item corresponding to the second data type in the second group of data items based on the evaluating the second data loading cost.

16. A computer system, comprising:

a processor;

a network interface; and a non-transitory computer-readable medium having stored thereon instructions executable by the computer system to cause the computer system to perform operations comprising:

accessing a computer-based transaction processing engine configured to process transaction requests using a transaction rule engine;

receiving a request for processing a transaction from a requesting computing device;

determining processing path exclusion information for the transaction based on an analysis of transaction processing data related to previous processing of a plurality of electronic transactions by a transaction rule engine, wherein the processing path exclusion information comprises one or more excluded data types of a plurality of data types usable for processing the transaction, wherein the processing path exclusion information indicates one or more excluded processing paths, out of a plurality of potential processing paths usable by the transaction rule engine in evaluating electronic transactions, that are determined to be unnecessary for the transaction rule engine to evaluate the transaction, wherein each of the plurality of potential processing paths comprises one or more evaluation nodes, and wherein each node in each of the plurality of potential processing paths includes one or more computing evaluations, and based on the processing path exclusion information, determining a data loading scheme for the transaction, wherein the data loading scheme specifies a pre-loading of a first group of data items corresponding to a first subset of data types from the plurality of data types and a lazy-loading of a second group of data items corresponding to a second subset of data types from the plurality of data types;

configuring the transaction rule engine to process the transaction based on the data loading scheme;

processing, using the configured transaction rule engine, the transaction data, wherein the processing comprises (i) loading the first group of data items, and not the second group of data items, for the transaction, (ii) evaluating the transaction using the loaded first group of data items, (iii) determining that a particular data item from the second group of data items is necessary for the evaluating, (iv) in response to determining that the particular data item is necessary for the evaluating, loading the particular data item, and (v) based on the loaded first group of data items and the loaded particular data item, generating a processing outcome for the transaction; and transmitting evaluation decision information indicating the processing outcome for the transaction.

17. The computer system of claim 16, further comprising a plurality of network-linked computing devices, wherein the transaction rule engine comprises a trained machine-learning classifier configured to evaluate a transaction risk of allowing the transaction to be processed.

18. The computer system of claim 16, wherein the operations further comprise:

determining a first data type and a second data type associated with the transaction; and evaluating, based on the analysis of the transaction processing data related to the previous processing of the plurality of electronic transactions by the transaction rule engine, a first historical usage rate of the first data type and a second historical usage rate of second data type.

19. The computer system of claim 16, wherein the operations further comprise:

determining a first data type and second data type associated with the transaction; and evaluating, based on the analysis of the transaction processing data related to the previous processing of the plurality of electronic transactions by the transaction rule engine, a first data loading cost for the first data type and a second data loading cost for the second data type.

20. The computer system of claim 16, wherein the operations further comprise:

storing, in a historical database of transaction evaluation data loading information, data loading metric information for the transaction, wherein the data loading metric information comprises usage information indicating data items required by the transaction rule engine to generate the processing outcome for the transaction.

* * * * *

UNITED STATES PATENT AND TRADEMARK OFFICE
CERTIFICATE OF CORRECTION

| | |
|---|---|
| PATENT NO. | : 11,900,271 B2 |
| APPLICATION NO. | : 17/549738 |
| DATED | : February 13, 2024 |
| INVENTOR(S) | : Srinivasan Manoharan et al. |

It is certified that error appears in the above-identified patent and that said Letters Patent is hereby corrected as shown below:

In the Claims

Claim 11, Column 25, Line 32, change, "determining a data configuration loading scheme for" to --determining a data loading scheme for--.

Signed and Sealed this
Twenty-third Day of April, 2024

*Katherine Kelly Vidal*

Katherine Kelly Vidal
*Director of the United States Patent and Trademark Office*